United States Patent [19]

He et al.

[11] Patent Number: 5,459,310

[45] Date of Patent: Oct. 17, 1995

[54] APPARATUS FOR SENSING DIFFERENT ATTENUATION WINDOWS WITHIN AN OPTICAL SCANNER

[75] Inventors: Duanfeng He, Ronkonkoma, N.Y.; Donald A. Collins, Jr., Duluth, Ga.; Daniel B. Seevers, Duluth, Ga.; Stephen J. Ames, Lawrenceville, Ga.

[73] Assignee: AT&T Global Information Solutions Company, Dayton, Ohio

[21] Appl. No.: 238,117

[22] Filed: May 4, 1994

[51] Int. Cl.⁶ .................................................. G01J 1/32
[52] U.S. Cl. .................................................. 250/205; 372/31
[58] Field of Search .................. 250/205; 219/121.61, 219/121.62; 372/31

[56] References Cited

U.S. PATENT DOCUMENTS

| | | | |
|---|---|---|---|
| 3,790,758 | 2/1974 | Tanigawa et al. | 235/483 |
| 3,806,829 | 4/1974 | Duston et al. | 372/38 |
| 4,122,409 | 10/1978 | Marlett et al. | 372/26 |
| 4,593,186 | 6/1986 | Swartz et al. | 235/472 |
| 4,783,787 | 11/1988 | Doi et al. | 372/31 |
| 4,879,650 | 11/1989 | Kurimoto et al. | 177/25.15 |
| 4,971,177 | 11/1990 | Nojiri et al. | 186/61 |
| 4,991,692 | 2/1991 | Nojiri et al. | 186/61 |
| 5,070,966 | 12/1991 | Brennan | 186/61 |

Primary Examiner—Edward P. Westin
Assistant Examiner—Jacqueline M. Steady
Attorney, Agent, or Firm—Paul W. Martin

[57] ABSTRACT

An apparatus for sensing different attenuation windows within an optical scanner which adjusts the power level of a laser to a maximum safe power level. The apparatus includes an attenuation sensor which senses the amount of attenuation of the laser beam by a first attenuation window, and a laser power adjuster which changes the laser power level to an optimal but safe level based upon the sensed amount of attenuation of the laser beam. The apparatus may also include a detection circuit having a threshold detection level which is capable of being adjusted based upon the laser power level.

12 Claims, 2 Drawing Sheets

APPARATUS FOR SENSING DIFFERENT ATTENUATION WINDOWS WITHIN AN OPTICAL SCANNER

BACKGROUND OF THE INVENTION

The present invention relates to optical scanners and more specifically to an apparatus for sensing different attenuation windows within an optical scanner.

Optical scanners are well known for their usefulness in retail checkout and inventory control. Optical scanners generally employ a single laser source, the light from which is collimated and focused to produce a scanning beam. They may additionally employ a mirrored spinner to direct the beam against a plurality of stationary mirrors, and a detector to collect the beam after it is reflected by a bar code label. The pattern produced by such a scanner is characterized by lines oriented at various angles to one another.

It has been difficult for scanner manufacturers to achieve an economic advantage by using the same scanner components in a variety of product offerings. One of the problems that has made such achievement difficult has been compliance with laser safety standards. A countertop scanner which employs a scratch-resistant glass requires a more powerful laser beam than a scanner without such a glass because the glass attenuates the beam as it passes through.

Therefore, it would be desirable to provide an apparatus for an optical scanner which can allow a single scanner design to be used in a variety of product offerings by sensing different attenuation levels of scanning beams and adjusting laser power to optimize performance while complying with laser safety standards. It would also be desirable for the apparatus to be capable of adjusting detection threshold levels and speaker volumes.

SUMMARY OF THE INVENTION

In accordance with the teachings of the present invention, an apparatus for sensing different laser beam attenuation windows within an optical scanner is provided. The apparatus includes an attenuation sensor which senses the amount of attenuation of the laser beam by a first attenuation window, and a laser power adjuster which changes the laser power level to an optimal but safe level based upon the sensed amount of attenuation of the laser beam. The apparatus may also include a detection circuit having a threshold detection level which is capable of being adjusted based upon the laser power level.

In a first embodiment, the apparatus includes a magnetic switch having first and second positions corresponding to first and second power levels, and a magnet on a weigh plate which is located over a top surface of the scanner housing such that the magnet is in a position over the magnetic switch. Removal of the weigh plate causes the magnetic switch to change from the first position to the second position. Power level changes are automatically implemented with changes in scanner use (e.g. counter-top to vertical scanner).

A second embodiment of the apparatus employs a software switch implemented by scanning a programming bar code label which programs a controller to change laser power levels. The software switch requires operator intervention to change power levels, which may be advantageous as a safety backup when used in conjunction with the first embodiment.

It is accordingly an object of the present invention to provide an apparatus for sensing different attenuation windows within an optical scanner.

It is another object of the present invention to provide an apparatus for sensing different attenuation windows within an optical scanner which automatically changes the laser power level when the scanner is modified for a different use by changing the attenuation window.

It is another object of the present invention to provide an apparatus for sensing different attenuation windows which requires operator intervention to change power levels after changing the attenuation window.

It is another object of the present invention to provide an optical scanner having components that may be used in a plurality of different types of scanners, but which produce laser power levels that are optimal for scanning but within established laser safety standards.

It is another object of the present invention to provide an apparatus for sensing different attenuation windows within an optical scanner which automatically changes the laser power level and the threshold detection level of the scanner when the scanner is modified for a different use.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
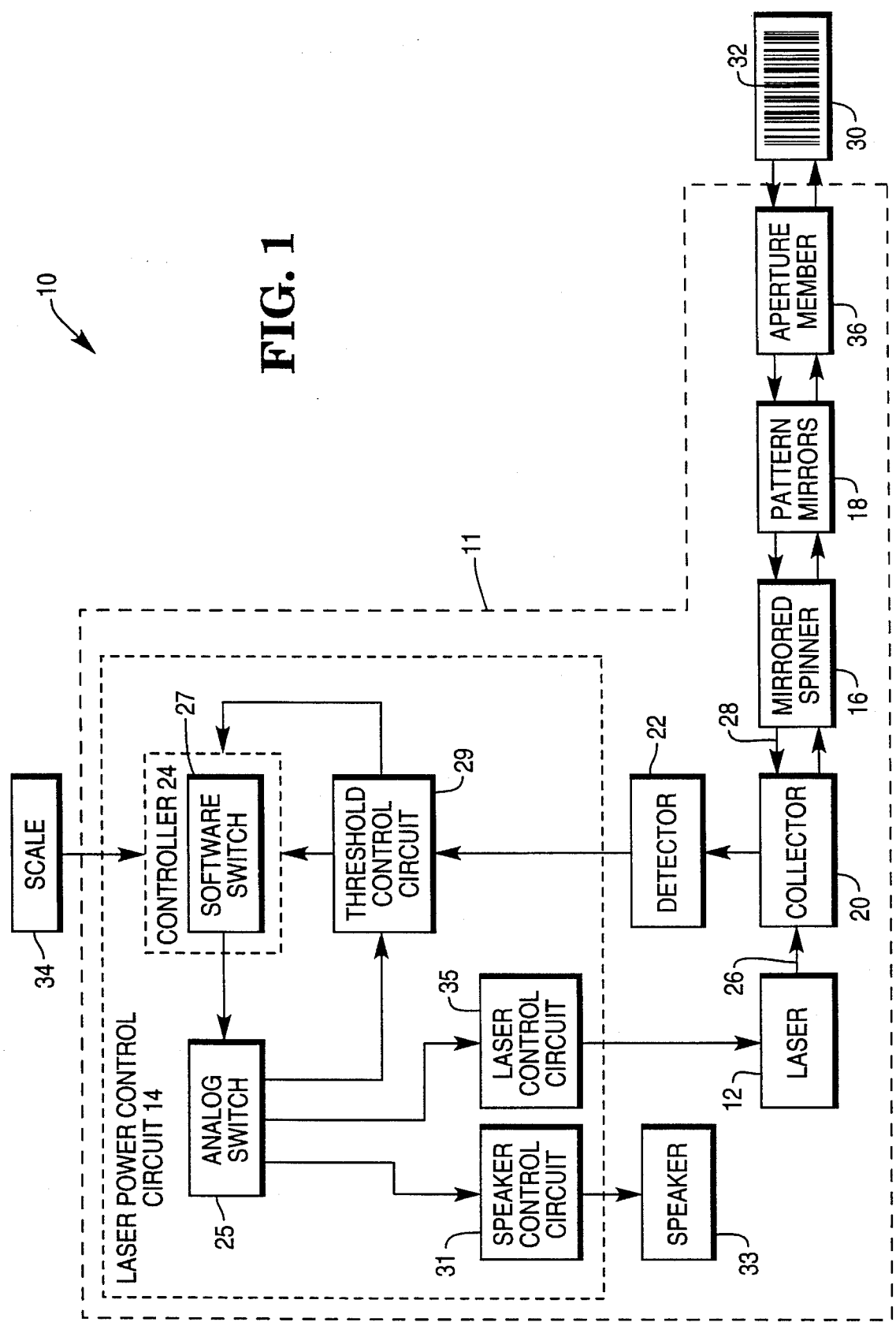
FIG. 1 is a block diagram of an optical scanner including the apparatus of the present invention.

Referring now to FIG. 1, an optical scanner 10 includes housing laser 11, laser 12, laser power control circuit 14, mirrored spinner 16, pattern mirrors 18, collector 20, and detector 22. A counter-top version of scanner 10 my include scale 34.

Laser 12 produces beam 26.

Laser power control circuit 14 adjusts the power of laser 12 to predetermined levels in accordance with the intended use of scanner 10. The predetermined levels provide optimal scanning power but are within established laser safety standards.

Laser power control circuit 14 preferably includes threshold detection circuit 29 and speaker volume control circuit 31, and laser control circuit 35. Threshold detection circuit 29 adjusts the threshold of detection to an optimal level for signals from detector 22 under each laser power setting. Threshold detection circuit 29 is preferably an analog-to-digital converter. Speaker volume control circuit 31 adjusts the volume level of speaker 33 to an optimal level for each scanner configuration. Laser control circuit 35 adjusts the power level of laser 12.

Laser power control circuit 14 also includes controller 24 and analog switch 25. Analog switch 25 may provide automatic adjustment of laser power levels or may be manually operated. Controller 24 decodes the information contained within bar code label 32 and may provide a software switch 27 which operates in series with analog switch 25 to ensure that the right power level is set for the intended use and configuration of scanner 10, regardless of the position of analog switch 25.

Software switch 27 is preferably operated by using programming bar code labels to change the laser power level. Thus, software switch 27 requires user intervention to change power levels. Programming bar code labels are discussed in commonly-assigned U.S. Pat. No. 4,868,375 entitled "Method For Changing The Functions Of A Bar Code Reader" issued Sep. 19, 1989 to Blanford. This patent is hereby incorporated by reference.

Preferably, programming involves the following steps. First, a bar code label which toggles power from low to high or high to low is scanned. It may be scanned a second time to toggle power to the desired setting. Scanner 10 beeps once when power is at the low setting and beeps twice when power is at the high setting. Second, a bar code label which locks in the power setting is scanned.

When many power levels are envisioned, a programming bar code level may be employed to toggle power from one level down to the next.

Mirrored spinner 16 reflects beam 26 at pattern mirrors 18 and directs light 28 reflected from bar code label 32 on item 30 towards collector 20.

Pattern mirrors 18 create a pattern which passes through aperture member 36 to illuminate bar code label 32 on item 30. Reflected light 28 from bar code label 32 is reflected by pattern mirrors 18 towards mirrored spinner 16.

Aperture member 36 is preferably a type of glass which may vary depending upon the intended use of scanner 10. For counter-top use, aperture member 36 is preferably made of a scratch-resistant glass, such as sapphire glass. A thinner, less scratch-resistant, glass is preferred when scanner 10 is used in a vertical position without scale 34.

Advantageously, aperture member 36 is easily removable, and the scanner use is therefore easily changed from counter-top to vertical or back again. Alternatively, power settings may be fixed during manufacture.

Collector 20 directs reflected light 28 at detector 22.

Detector 22 converts reflected light 28 into electrical signals based upon the intensity of reflected light 28.

For a counter-top use of scanner 10, scale 34 sends a signal to controller 24 based upon the weight of an item.

Figure 2:
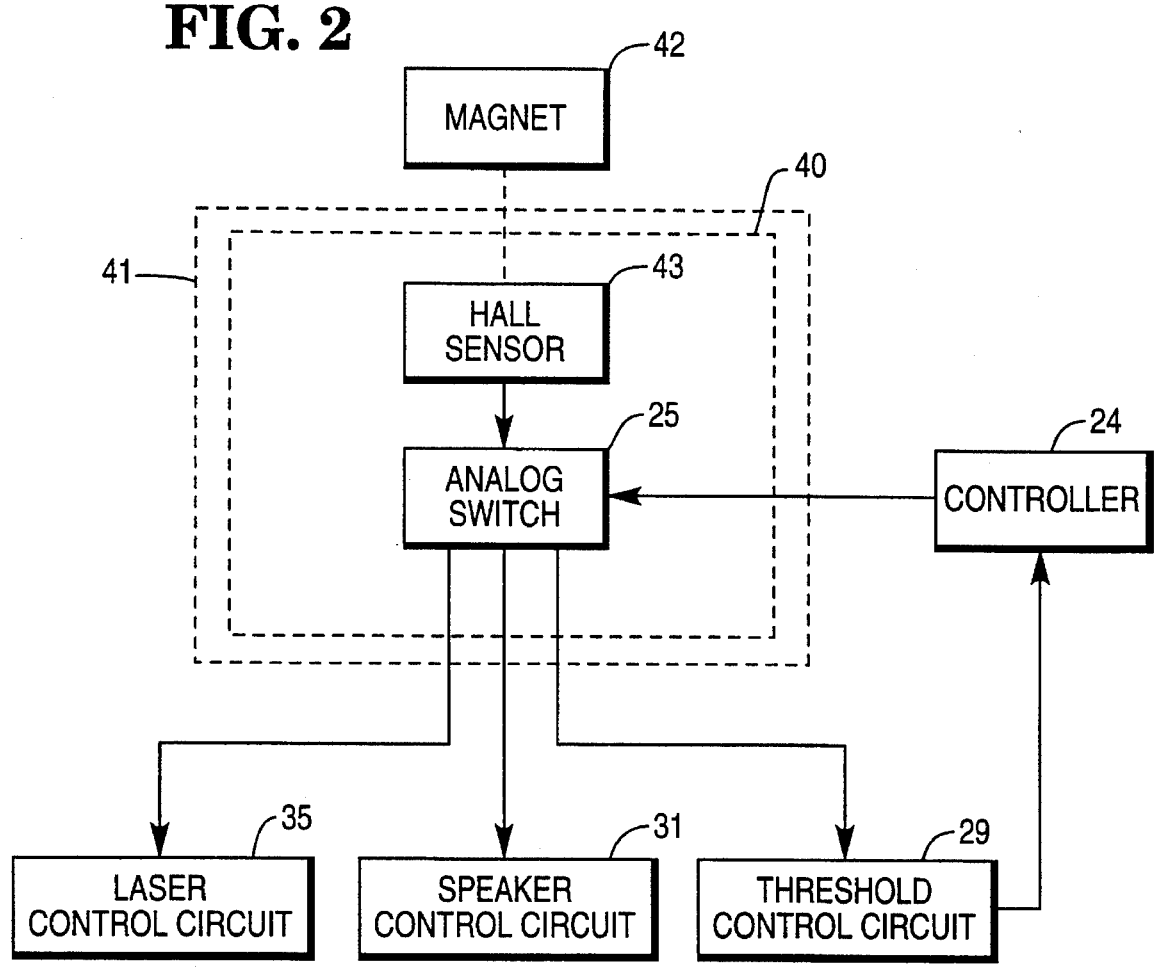
FIG. 2 is a block diagram of the components of the optical scanner which are responsible for adjusting laser power levels and detection levels.

Referring now to FIG. 2, a preferred embodiment of laser power control circuit 14 is based on a scanner that can be configured for either of two power settings. Thus, laser power control circuit includes attenuation sensor 41. Attenuation sensor 41 may include magnetic switch 40 which is controlled by the presence or absence of magnet 42. Magnetic switch 40 has open and closed positions.

Preferably, magnetic switch 40 includes Hall sensor 43 and analog switch 25. When sensor 43 does not sense the presence of magnet 42, it signals analog switch 25 to decrease laser power, decrease speaker volume, and increase the detection threshold. An increase in the detection threshold is preferred in the vertical version of scanner 10 in order to more easily read bar code labels that are farther away from scanner 10 and cause an operator to avoid scratching aperture member 36. When sensor 43 senses the presence of magnet 42, it signals analog switch 25 to increase laser power, increase speaker volume, and adjust the detection threshold. A decrease in the detection threshold is preferred in the counter-top version of scanner 10.

Figure 3A:
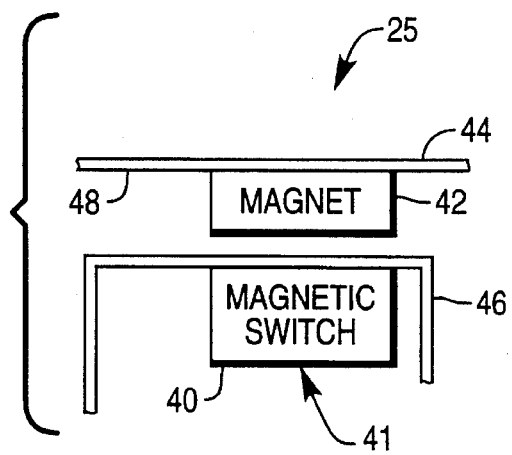
FIG. 3A is a diagrammatic view of a counter-top optical scanner containing a preferred embodiment of the apparatus of the present invention.
Figure 3B:
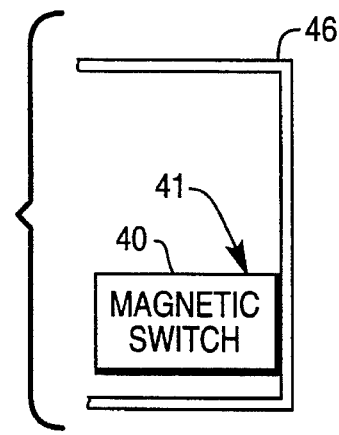
FIG. 3B is a diagrammatic view of a vertical optical scanner containing the preferred embodiment of the apparatus of the present invention.

Turning now to FIGS. 3A and 3B, magnetic switch 40 is preferably mounted within scanner housing 46. Magnet 42 is mounted on the underside 48 of weigh plate 44 (part of scale 34) is aligned over magnetic switch 40 when scanner 10 is being used as a counter-top scanner (FIG. 3A). When scanner 10 is used in a vertical position, scale 34 and magnet 42 are not installed (FIG. 3B).

Magnetic switch 40 provides automatic adjustment of laser power levels. Both the first and second power levels are optimal for reading bar code label 32, but within established laser safety standards.

If additional safety is required, software switch 27 may be employed to require user intervention when laser power levels are set.

Although the present invention has been described with particular reference to certain preferred embodiments thereof, variations and modifications of the present invention can be effected within the spirit and scope of the following claims.

What is claimed is:

1. An optical bar code scanner comprising:

a laser which is capable of being driven at first and second power levels and which produces a beam for scanning bar code labels, wherein the second power level is greater than the first power level;

first and second aperture members which attenuate the beam by different predetermined amounts, wherein the second aperture member attenuates the beam more than the first aperture member; and a switch for setting the laser to the first power level when the first aperture member is installed within the scanner, and to the second power level when the second aperture member is installed within the scanner.

2. The optical scanner as recited in claim 1, wherein the switch comprises an analog switch.

3. The optical scanner as recited in claim 1, wherein the switch comprises a software switch.

4. The optical scanner as recited in claim 2, wherein the analog switch comprises a magnetic switch.

5. The optical scanner as recited in claim 2, wherein the switch further comprises a software switch in series with the analog switch.

6. The optical scanner as recited in claim 1, further comprising:

a housing containing the laser and having a top surface containing the aperture member; and a scale over the housing.

7. The optical scanner as recited in claim 6, further comprising:

a magnet mounted to the scale;

wherein the switch includes a magnetic switch mounted to the top surface of the housing, and wherein the magnet is located in a position adjacent the magnetic switch when the scale is installed on the scanner.

8. The optical scanner as recited in claim 1, further comprising:

a detector; and a threshold control circuit coupled to the detector which has a threshold detection level;

wherein the switch also adjusts the threshold detection

OTHER PUBLICATIONS

9. The optical scanner as recited in claim 1, further comprising:
   a speaker; and
   a speaker control circuit coupled to the speaker which has a volume level;
   wherein the switch also adjusts the volume level based upon the one power level.

10. An optical bar code scanner comprising:
    a laser which is capable of being driven to a plurality of different power levels and which produces a beam;
    an aperture member which attenuates the beam by a predetermined amount;
    a detection circuit for converting light from the beam reflected by an item having a bar code label, having a threshold detection level which is capable of being adjusted based upon the power level of the laser; and
    a switch for setting the laser to a first power level of the different power levels based upon the amount of attenuation of the beam and for adjusting the threshold detection level based upon the first power level.

11. A method for configuring an optical bar code scanner comprising the steps of:
    (a) providing a laser which is capable of producing a laser beam for scanning bar code labels having first and second power levels, wherein the second power level is greater than the first power level;
    (b) providing first and second aperture members having first and second attenuation levels, wherein the second attenuation level is greater than the first attenuation level;
    (c) providing a switch for selecting either of the first or second power levels; and
    (d) selecting the first power level when the first aperture member is installed within a top surface of the optical bar code scanner, and selecting the second power level when the second aperture member is installed within the top surface of the optical bar code scanner.

12. A method for configuring an optical bar code scanner comprising the steps of:
    (a) providing a laser which is capable of producing a laser beam for scanning a bar code label having first and second power levels, wherein the second power level is greater than the first power level;
    (b) providing first and second glass aperture members through which the laser beam passes having first and second attenuation levels, wherein the second attenuation level is greater than the first attenuation level;
    (c) providing a detector for converting light reflected from an item having the bar code to electrical signals based upon the intensity of the reflected light, which has first and second threshold detection levels, wherein the second threshold detection level is less than the first detection threshold;
    (c) providing a switch for selecting either of the first or second power levels and either of the first or second threshold detection levels; and
    (d) selecting the first power level and the first detection level when the first glass aperture member is installed within a top surface of the optical bar code scanner, and selecting the second power level and the second detection level when the second glass aperture member is installed within the top surface of the optical bar code scanner.

* * * * *

UNITED STATES PATENT AND TRADEMARK OFFICE
CERTIFICATE OF CORRECTION

PATENT NO. : 5,459,310

DATED : October 17, 1995

INVENTOR(S) : Duanfeng He et al.

It is certified that error appears in the above-indentified patent and that said Letters Patent is hereby corrected as shown below:

Column 5, line 2, delete "OTHER PUBLICATIONS".

Signed and Sealed this

Nineteenth Day of March, 1996

Attest:

BRUCE LEHMAN

Attesting Officer *Commissioner of Patents and Trademarks*